Figure 1:
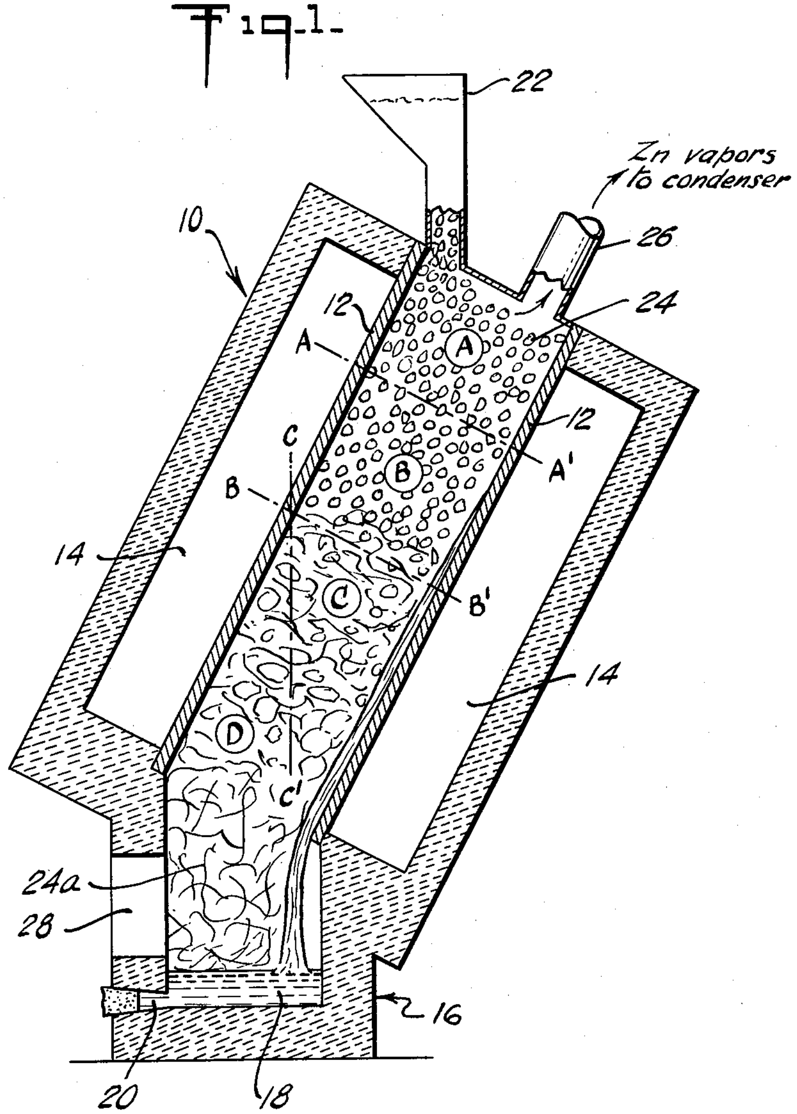

March 3, 1964 E. G. SUNDAY ETAL 3,123,465

PROCESS FOR SMELTING METALLURGICAL DUSTS

Filed Sept. 8, 1958 2 Sheets-Sheet 1

Fig-1-

INVENTORS:
ELMER G. SUNDAY
PIERRE P. TAUBENBLAT
BY
Kasper T. Serijan
ATTORNEY

INVENTORS:
ELMER G. SUNDAY
PIERRE P. TAUBENBLAT
BY Jasper T. Serijan
ATTORNEY

United States Patent Office 3,123,465

Patented Mar. 3, 1964

3,123,465

PROCESS FOR SMELTING METALLURGICAL DUSTS

Elmer G. Sunday, Red Bank, N.J., and Pierre P. Taubenblat, Brooklyn, N.Y., assignors to American Metal Climax, Inc., New York, N.Y., a corporation of New York Filed Sept. 8, 1958, Ser. No. 759,704
4 Claims. (Cl. 75—24)

This invention relates to the pyrometallurgical smelting of finely divided oxidic materials containing principally lead, zinc and tin as, for example, "bag house" dusts that are evolved and collected in various metallurgical operations. More particularly, the present invention relates to an improved process for carrying out the smelting of such dusts whereby enhanced yields of the metal values contained in the original dust may be obtained.

The practice of recovering lead, zinc and tin from metallurgical dusts has been carried out for a considerable time by various means. One process consists of smelting such dusts in admixture with carbon and soda ash and other fluxing materials in stationary, indirectly or electro-thermically heated shafts or retorts as described, for example, in U.S. Patent No. 2,139,065. This mode of processing is generally satisfactory in that it enables recovery of the zinc in the dust directly as metallic zinc by the appropriate condensation of vapors educted from the smelting chambers. The lead and tin values being essentially non-volatile at the smelting temperatures utilized are recovered as a molten metallic alloy mixture that collects in a pool at the bottom of the smelting chamber from which it is withdrawn by tapping at appropriate intervals. The residue resulting from the smelting process at the same time is likewise but separately removed from the bottom of the retort and normally discarded.

One drawback of this process has been the difficulties encountered in obtaining a completely satisfactory recovery of the lead and tin in the form of the molten metal product. The reason for this is the rather marked tendency of the residue which is often of a viscous nature to physically entrain an appreciable amount of the molten metal product. The incomplete separation of the molten metal from the residue may be remedied by subsequent treatment of the residue after its removal from the furnace to recover the entrained metals and particularly the tin which is the more valuable metal. Any additional treatment is at best, however, rather cumbersome, time consuming and increases processing costs considerably. When the smelting operation is being carried out continuously, the need for reworking the residue to separate the mechanically entrained molten metal is particularly objectionable for reasons that are readily apparent.

It is an object of this invention to provide an improved process for smelting metallurgical dusts of the nature hereinbefore indicated which provides for the substantially complete separation of any physically entrained molten metal from the otherwise barren residue during the course of smelting in a stationary smelting chamber without resorting to extraneous treatment of the residue after smelting for completing the recovery of lead and tin.

It is another object of the present invention to provide an improved process for smelting metallurgical dusts which is readily adaptable for continuous operation while minimizing the loss of valuable metals to the residue produced in the process.

These and other objects and advantages are realized according to the present invention by feeding agglomerates consisting of the oxidic dust in admixture with suitable amounts of carbonaceous material and soda ash through an inclined smelting chamber to provide a columnar charge which upon appropriate smelting results in the production of zinc vapors, a molten metallic product and a residue. The zinc vapors educted from the top of the columnar charge are condensed in accordance with conventional practice. The molten metal product formed during the smelting operation filters advantageously through only a relatively small portion of the columnar charge due to the tilted arrangement of the smelting chamber and channels along the lower sidewall eventually accumulating at the bottom of the furnace. In this manner a greatly improved separation of the molten metal product is effected leaving an essentially barren residue which can be discarded without incurring any significant metal losses.

The invention will be hereinafter more fully described with reference to the accompanying drawing showing, by way of example, one form of furnace constructed and operated in accordance with the invention wherein:

FIGURE 1 diagrammatically illustrates in longitudinal cross section an embodiment of the apparatus used in the improved smelting process of the present invention.

Figure 2:
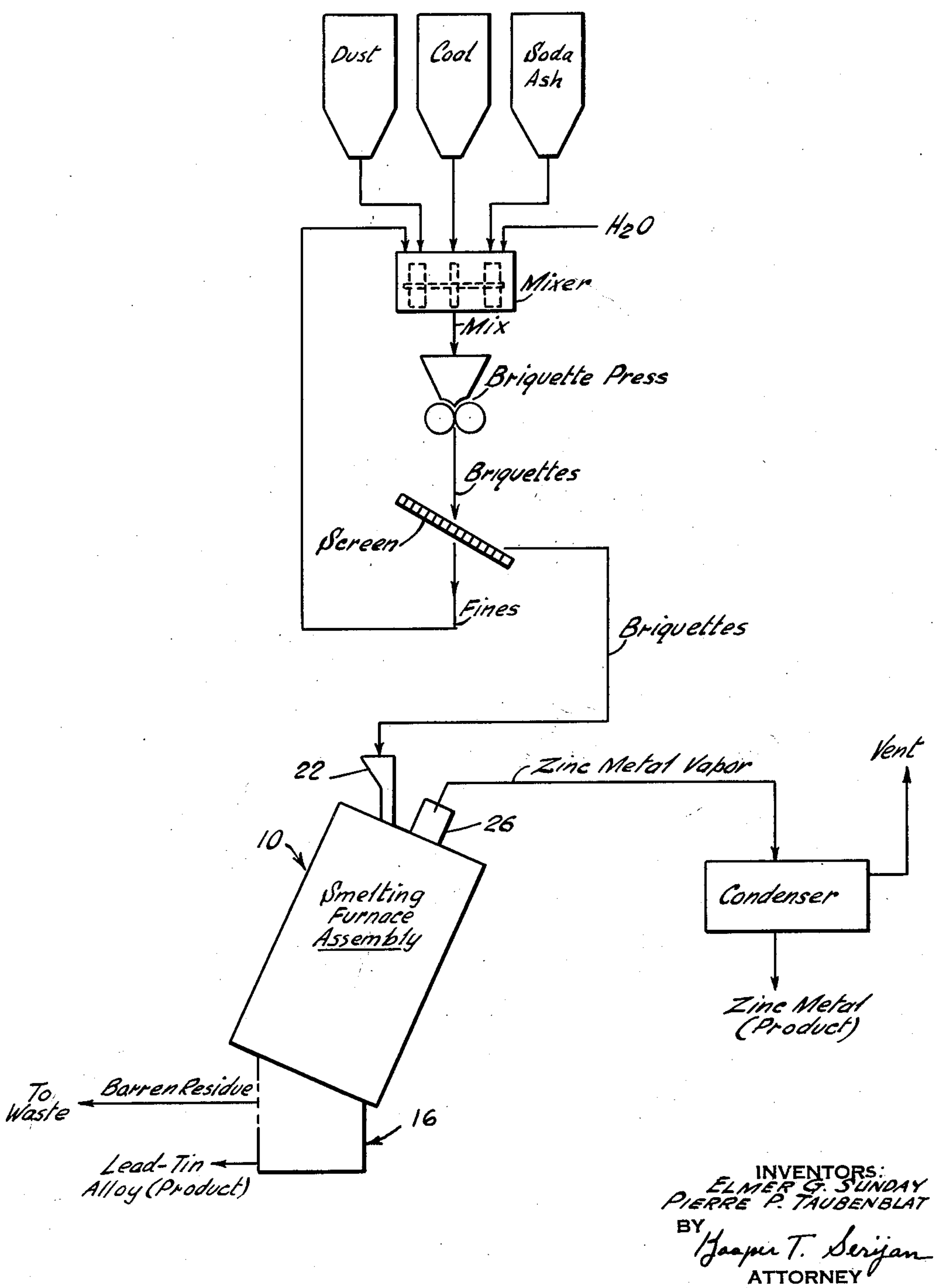

FIGURE 2 is a schematic flow sheet of a plant adapted for carrying out the improved process of this invention.

Referring now to FIGURE 1, there is shown a smelting furnace assembly 10 comprising an inclined heatable smelting chamber confined by side-walls 12 around which an enclosed combustion chamber 14 constructed preferably of suitable refractory material is provided. The smelting chamber and its associated combustion chamber are supported on a refractory base portion 16 which contains a well 18 for the collection of molten metal that may subsequently be drained therefrom through a suitable tap-hole 20 shown with a tap-hole plug in place. Feeding means such as a hopper 22 equipped with a suitable seal (not shown) is provided at the top of the furnace assembly to enable the maintaining of a continuous columnar charge of agglomerated material 24 in the smelting chamber. The zinc vapor evolved during smelting rises through the charge and is educted through a conduit 26 to a suitable condensing or collecting system for the recovery of the zinc. A lateral opening 28 is located on the side of base portion 16 which is opposed to the direction in which the smelting chamber is inclined. This opening serves for the removal of spent charge residue 24*a* from the bottom of the smelting chamber at a level above the molten metal normally permitted to accumulate in well 18. The opening 28 is provided with a suitable removable closure (not shown) to minimize heat losses when residue is not being withdrawn therethrough.

The portion of the assembly containing the smelting chamber and its associated combustion chamber 14 is inclined from the vertical so as to maintain the charge 24 that passes through the smelting chamber in an inclined position until it enters the base portion 16 of the furnace assembly, said base portion including all that part of the assembly which lies below the lower ends of the smelting chamber 12.

Significant advantages are obtainable by smelting the charge while it is maintained in an inclined position as will be seen upon consideration of the overall smelting process which occurs in the smelting chamber. Upon being fed into the heated smelting chamber from the feeder 22, the fresh charge 24 of agglomerated feed is subjected to preheating in a zone designated A and lying between the line A—A′ and the top of the chamber. Preheating is accomplished not only through the heat conducted through the walls of the chamber 12, but also by the rising gases and vapors, including metallic zinc vapors which are generated in the reduction zone indicated by B. In this latter zone generally designated as being within the region between the lines A—A′ and B—B′ shown in FIG. 1, the carbonaceous material incorporated in the agglomerated feed reacts in the usual manner with the reducible oxides of zinc, lead and tin reducing the same to their respective metals. After completion of the reduction in the zone B, the charge now comprising primarily spent residue passes downwardly into what is here termed the residue zone generally designated as being below the line B—B' and comprising regions designated as C and D. At the same time, zinc vapors generated in the reduction zone B leave the chamber after rising through the overlying charge through the conduit 26 while the lead and tin metal flow as liquids by gravity towards the inferior or lowermost wall region appearing in FIG. 1 as the right sidewall of the inclined smelting chamber, and thence downwardly along said inferior wall into the wall 18 as indicated in FIG. 1.

The advantages stemming from the inclined or tilted arrangement of the smelting chamber shown in FIG. 1 with respect to the smelting of a columnar charge relate primarily to the facilitated and more complete separation of the molten metal product as formed from the mass of material comprising the residue produced in the smelting operation. By way of explanation, it will be seen that as molten metal is formed, say commencing in the region of zone B and continuing or in zone C, it tends to gravitate toward the inferior wall rather than work its way through practically the entire mass of material at the lower level as is the case where a vertical smelting chamber is used. Once the molten metal product containing the lead and tin and possibly other metal values reaches the inferior wall, it tends to channel therealong until discharged into well 18. By draining off the main portion of the molten metal in this manner, the condition is provided wherein the residue remaining after reduction of the oxides in zones B and C is not subjected to the passage of any appreciable amounts of molten metal therethrough. This is particularly true with respect to zone D of the smelting chamber indicated as being to the left of line C—C' shown in FIG. 1. In this region, the residue, in the absence of any appreciable amounts of descending molten metal therethrough and being still subjected to heating through walls 12, is completely rid of its residual content of molten metal to the point where it is practically completely barren of zinc, lead and tin. Accordingly, the residue may be discarded without reworking the material for recovery of additional metal values as heretofore usually required for avoiding detrimental losses of metal values.

The arrangement shown in FIG. 2 schematically illustrates the incorporation of the inclined smelting furnace assembly in a system adapted for continuous operation. In operation, the metalliferous dust is combined with appropriate amounts of soda ash and a carbonaceous material such as coal or other substances commonly used for the purpose. For providing intimate mixing of the dust, soda ash and carbonaceous material a chaser mill or edge runner may be used. The moisture content of the mixture conducive to the formation of agglomerates or briquettes of sufficient strength is controlled by the amount of water sprayed into the mixture preferably during the mixing operation. The thoroughly mixed material is then agglomerated as by pelletizing, nodulizing or briquetting and the resulting agglomerates are sceened for fines removal prior to their passage to a hopper or feeder adapted to maintain the columnar charge within the tilted furnace during operation thereof.

The smelting chamber of the furnace may be of any desired design and is not limited to the embodiment shown in FIG. 1. The transerve cross-section thereof may, for example, be circular, oval, square, rectangular or of any other configuration and the height or length of the unit may be varied as desired. For obtaining the advantages attributable to the present invention, however, it is essential that the chamber be inclined or tilted as previously stated, the angle of inclination being such that the provision of an adequate drainage zone in the lower region of the smelting chamber is assured. The degree of tilt will depend to some extent on the shape and size of the smelting chamber but it has been found that an inclination generally between 15 to 45° from the vertical and preferably between 20 to 40° and optimally of about 35° is satisfactory for the purpose.

By way of illustration, a smelting chamber constructed of silicon carbide and having an internal diameter of 8 inches and a length of 5 feet may be used, the chamber being tilted at an angle of 35° from the vertical. A representative oxidic dust containing about 19% zinc, 26% lead and 11% tin agglomerated after mixing with about 300% of carbon stoichiometrically required for zinc reduction and 20% soda ash and 10% by weight of moisture (based on the weight of oxidic dust) is fed to the smelting chamber preferably in the form of pillow-shaped briquettes measuring approximately 1 x ½ x 3 inches in size. A feed rate sufficient to maintain the columnar charge within the smelting chamber is used, the latter being heated to provide a charge temperature in the smelting zone and therebelow generally between 1100 and 1300° C. and preferably about 1250° C. Better than 99% of all the molten metal product formed in the reduction of the agglomerated charge is readily recoverable without resorting to any subsequent processing of the residue material.

As smelting of the charge takes place the continuity of the process is maintained by withdrawing portions of spent residue below the bottom of the smelting chamber while the required amounts of new charge agglomerates are supplied to the top of the inclined charge column with a view to maintaining a reasonably constant charge column level. Obviously, the rate at which the residue is withdrawn should not exceed the smelting rate as the residue will then contain appreciable amounts of unreduced oxides. This condition can be readily avoided in the case of an agglomerated charge as used herein by operating such that the residue withdrawn contains no unfused agglomerates. Since the reduction of zinc, lead and tin oxides are strongly endothermic reactions, the fusion of the individual charge agglomerates is prevented until all of these heat-absorbing reactions have been completed. Thus for practical purposes the rate of residue withdrawal and the feeding of new charge may be controlled by a visual inspection of the residue as it is withdrawn.

As shown in FIGURE 2, the zinc vapor educted from the smelting furnace is passed to a condenser for the recovery of zinc as metal. Such equipment has been extensively described in the art and includes systems where the zinc is condensed by shock chilling the vapor with liquid zinc or lead or by other means which are suitable to the temperature and $CO_2$ concentration of the educted vapor. Alternatively, the zinc vapor may be burned externally of the smelting furnace to form zinc oxide in accordance with conventional practices. In this connection the process herein described is particularly advantageous in that zinc oxide of very high purity may be produced.

While in the foregoing specification this invention has been described in relation to a preferred embodiment thereof and specific details of this embodiment have been set forth for the purpose of illustration, it will be apparent to those skilled in the art that this invention is susceptible to other embodiments and that many of the details herein set forth can be varied considerably without departing from the basic concept of the invention.

We claim:

1. The process of treating metallurgical dusts containing oxides of zinc, lead and tin for the production of zinc as a product, lead-tin alloy as a separate product and the formation of a discardable residue that is practically devoid of zinc, lead and tin metal values, comprising the steps of agglomerating said dusts in admixture with a carbonaceous substance, soda ash and needed moisture, continuously passing the agglomerates thus obtained as a columnar charge downwardly through an inclined smelting chamber such that the longitudinal axis of said columnar charge is at an angle of at least 15 but not exceeding 45° from the vertical, subjecting said charge throughout its entire downward travel in the inclined smelting chamber to a temperature sufficient to effect substantially complete reduction and elimination from said agglomerates of the volatile zinc and non-volatile lead and tin values contained therein, maintaining the downward passage of said agglomerates at a rate such that essentially complete draining of the eliminated non-volatile lead and tin from the resulting residual agglomerate material is effected by collecting and channeling of said eliminated lead and tin along the inferior wall of said inclined smelting chamber before the agglomerates in said columnar charge reach the bottom of said inclined chamber, withdrawing the eliminated volatile zinc as vapors from overhead, continuously discharging the residual agglomerate material practically devoid of zinc, lead and tin values as a discardable residue from the bottom of said inclined smelting chamber and separately but simultaneously collecting the eliminated lead and tin from the bottom of said inclined smelting chamber as molten lead-tin alloy product.

2. The process of claim 1 wherein the longitudinal axis of the columnar charge passing downwardly through the inclined smelting chamber is at an angle of from 20 to 40°.

3. The process of claim 1 wherein the columnar charge is maintained at a temperature of from 1100 to 1300° C. during its passage through the inclined smelting chamber.

4. The process of claim 1 wherein the agglomerates consist essentially of briquettes.

References Cited in the file of this patent

UNITED STATES PATENTS

| | | |
|---|---|---|
| 2,040,825 | Betterton | May 19, 1936 |
| 2,139,065 | Betterton | Dec. 6, 1938 |
| 2,344,445 | Mansfield | Mar. 14, 1944 |
| 2,536,365 | Handwerk | Jan. 2, 1951 |
| 2,543,420 | Ogg | Feb. 27, 1951 |
| 2,776,881 | Thomsen | Jan. 8, 1957 |